(No Model.)  3 Sheets—Sheet 1.
F. M. BARNEY.
POWER TRANSMITTING GEAR.
No. 572,593. Patented Dec. 8, 1896.
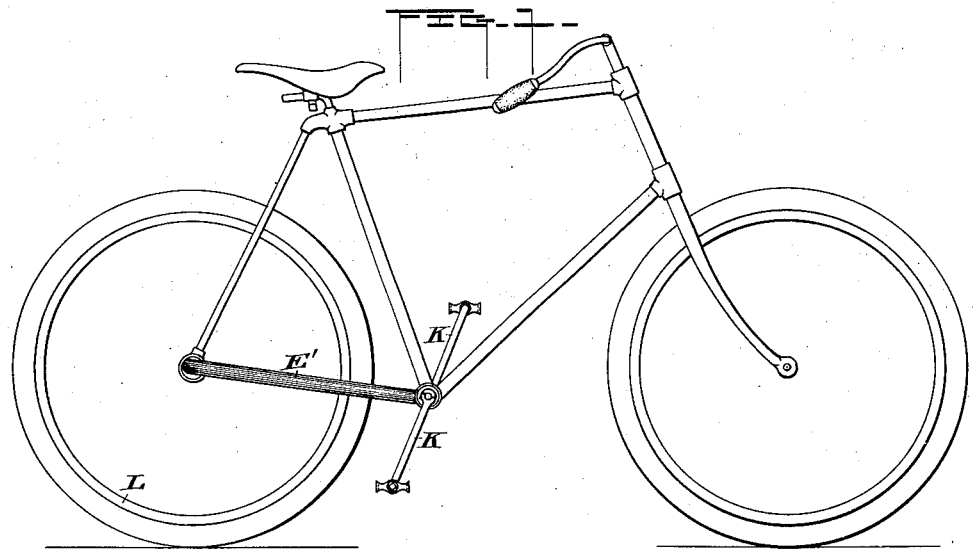
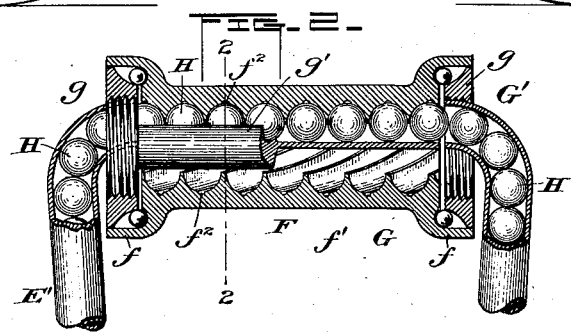
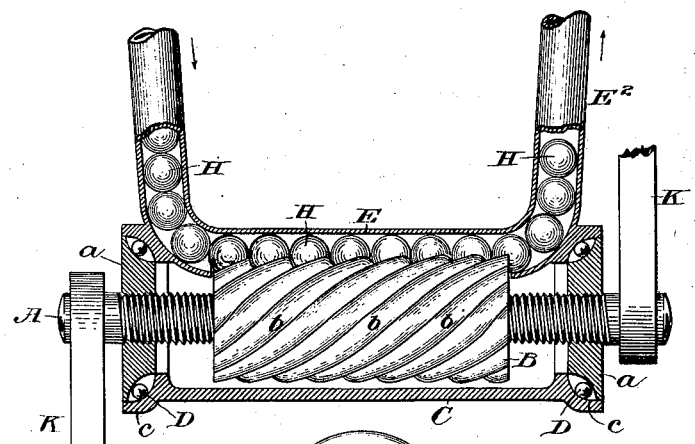
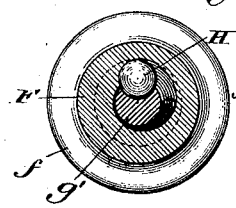
Witnesses
C. W. Smith
M. A. Dillon
Inventor
F. M. Barney
By Geo. W. Whittaker
Attorney

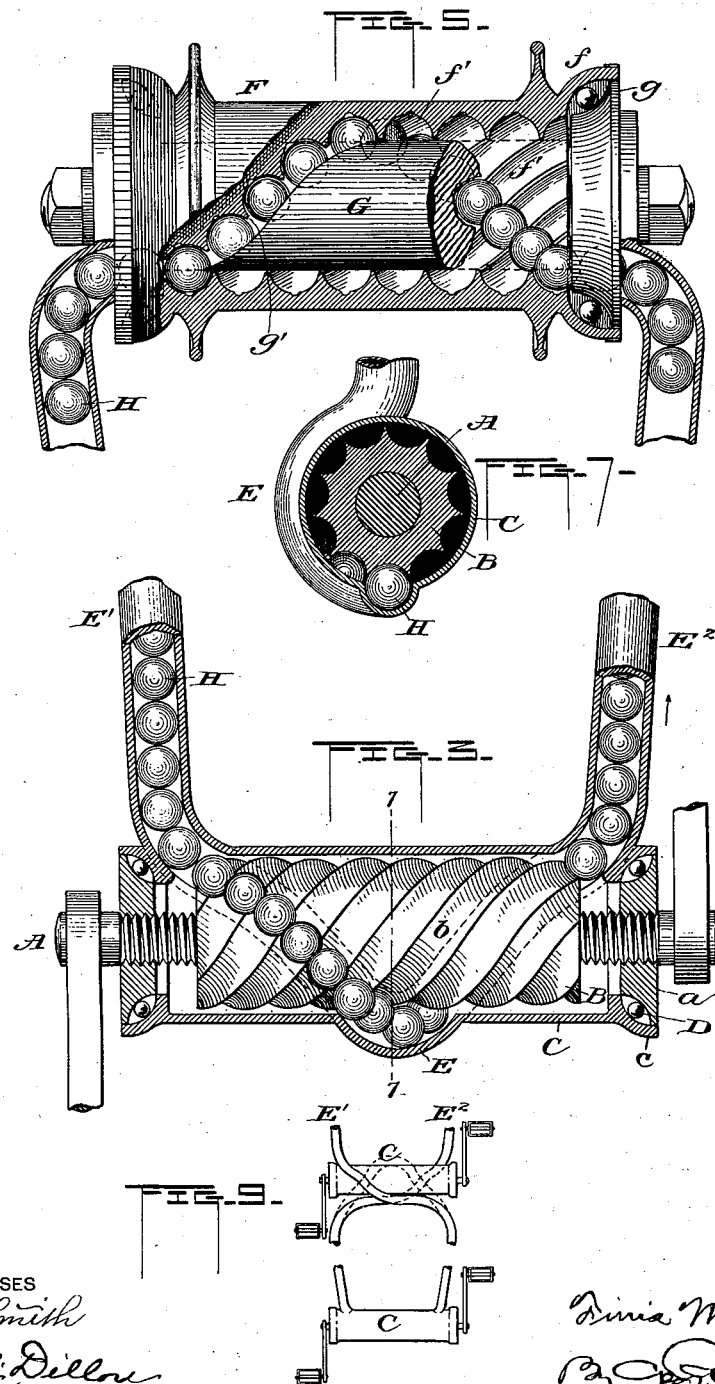

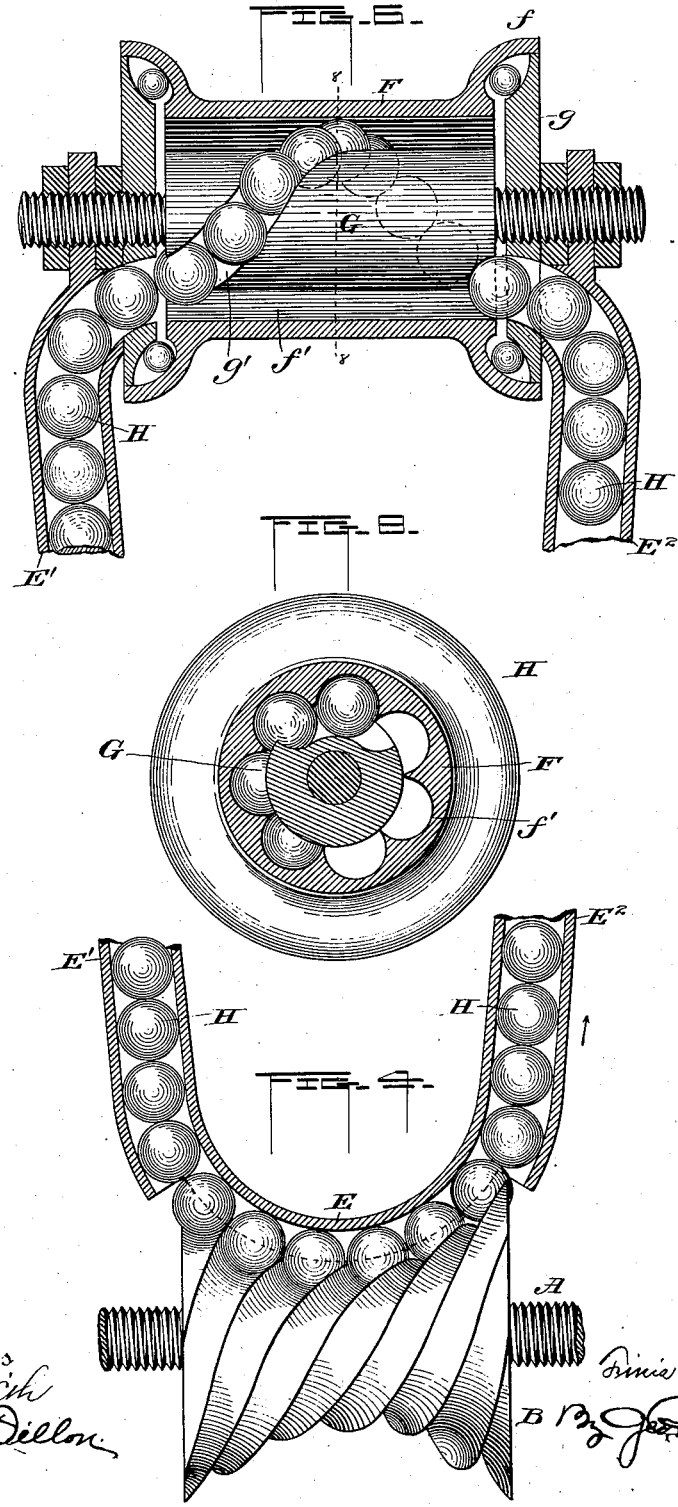

UNITED STATES PATENT OFFICE.

FINIS M. BARNEY, OF ELM CREEK, NEBRASKA.

POWER-TRANSMITTING GEAR.

SPECIFICATION forming part of Letters Patent No. 572,593, dated December 8, 1896.

Application filed November 15, 1895. Serial No. 569,083. (No model.)

*To all whom it may concern:*

Be it known that I, FINIS M. BARNEY, a citizen of the United States, residing at Elm Creek, in the county of Buffalo and State of Nebraska, have invented certain new and useful Improvements in Power-Transmitting Gear; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to mechanism for communicating motion and power from one rotating shaft to another, irrespective of their relative positions. It is applicable to all machines and appliances where such a result is desirable, but I have for the sake of illustration shown it as employed in place of the usual bicycle driving-gear, composed of an endless chain and sprocket-wheels.

My invention consists in the combination, with an endless series of loose balls, of certain specific grooved devices engaging with the balls to drive them and similar devices adapted to be driven by the moving series of balls.

Various modifications of my invention will suggest themselves, some of which I have illustrated and described.

In the drawings, Figure 1 is a side elevation of a bicycle equipped with my improved driving-gear. Fig. 2 is a sectional top plan view of one form of driving and receiving gear. Fig. 2$^a$ is a section on line 2 2, Fig. 2. Figs. 3 and 4 show modified driving-worms. Figs. 5 and 6 show modified receiving-worms. Fig. 7 is a cross-section of Fig. 3 on line 7 7. Fig. 8 is a cross-section of Fig. 6 on line 8 8. Fig. 9 shows the arrangement for a tandem bicycle.

On the driving-shaft A is secured a cylinder B, having external helical grooves $b$ semicircular in cross-section and preferably of rather coarse pitch. This worm is mounted to rotate in a stationary casing C, as, for instance, by means of cones $a$ upon the shaft A, ball-casings $c$ in the ends of the casings C, and steel balls D between them.

Along one side of the casing runs a straight tube E, preferably circular in cross-section and cut away on one side to permit the worm B to enter the tube to about the center of the same. At each end the tube curves outward until the ends lie nearly parallel in the same plane.

The hub F of the driven or receiving wheel is mounted to rotate freely on a stationary shaft G, having at each end a screw-threaded head G', on which are mounted the cones $g$ of the ball-bearings, the ball-casings $f$ being formed in the ends of the hub.

The interior of the hub is provided with helical grooves $f'$ semicircular in cross-section, and having a small gutter $f^2$ along their bottoms to contain oil or other lubricant. The pitch of these grooves is quite coarse. The stationary shaft G has a groove or channel $g'$ running from one end to the other end of the same, semicircular in cross-section as the grooves in the hub F and in the driving-worm B. The ends of this groove or channel $g'$ are connected by tubes E' E² with the ends of the tube E, so as to form therewith an endless closed passage-way.

A series of steel balls H, all of the same diameter and carefully trued and hardened, fills the tubes E E' E² and the groove or channel $g'$, fitting into the semicircular grooves $b$ and $f'$ in the worms B and hub F. The balls may be hollow, if desired.

When the driving-worm B is turned, it acts upon the balls, forcing them along through the tubes and the channel $g'$, the entire series moving at once like a column of liquid. In their passage through the channel $g'$ the balls act upon the helical internal grooves $f'$ of the hub F and cause the latter to turn on the stationary shaft G.

In applying this device to a bicycle the worm B is mounted on the shaft to which the cranks K are attached, while the hub F is made the hub of the rear driving-wheel L. The tubes E' E² are either attached to the lower braces or substituted for them. When the rider operates the cranks, the column of balls travels continuously through the rear hub, turning the same and driving the bicycle forward. A reversal of the movement of the cranks will turn the wheel backward.

The speed of the bicycle depends upon the pitch of the grooves in the worm and hub. Thus by diminishing the pitch of the driving-worm B the movement of the balls will be slower, but the power will be increased, while by diminishing the pitch of the rear hub F the speed will be increased at the expense of power, because the hub will be given a greater number of turns during the passage of a ball from one end of the hub to the other.

In Fig. 3 the tube E, through which the balls pass while in contact with the driving-worm B, is not straight, as in Fig. 2, but is curved to pass helically around the worm in a direction reverse to that of the grooves b. The tube is really a half-tube, formed integral with or attached to the casing C, as clearly shown in Fig. 7. The balls in passing from one end of the worm to the other through this tube traverse a greater distance than in the construction shown in Fig. 2, and hence move more rapidly for a given speed of the worm. This is therefore a less powerful driving device than Fig. 2.

In Fig. 4 is shown a slight modification of Fig. 2, in which the balls move in a curved path when in contact with the worm B. The grooves b are so laid out on this worm that the pitch is in a given inverse ratio to the diameter, in order to impart the same speed to the balls at all points.

In the modification of the driven or receiving hub shown in Fig. 5 the groove $g'$ in the stationary shaft G is helical instead of straight, the balls passing around the shaft as well as from end to end. It follows that each ball, in addition to the movement it imparts to the hub by reason of the helical grooves $f'$ in said hub, also gives the hub a further movement due to the revolution of the ball around the shaft. For instance, if the helical grooves $f'$ make one turn in running from one end of the hub to the other and the helical groove $g'$ also makes one turn around the shaft, then the passage of a ball from one end of the shaft to the other will cause two revolutions of the hub. This construction is therefore a speed device.

By omitting the helical grooves in the hub F and substituting for them straight grooves parallel with the axis of the shaft G, retaining, however, the helical groove in said shaft, the modification shown in Fig. 6 is obtained. This gives a slower speed than Fig. 5, the turning of the hub being due to the revolution of the balls around the shaft in their passage through the helical groove $g'$.

It will be observed that in carrying out my invention I can run the tubes $E'$ $E^2$ in any direction in either straight or curved lines, and that the axis of the receiving-hub may lie in any desired position, irrespective of the position of the driving-worm. The balls being loose and unattached to each other are free to roll upon one another and upon the walls of the tubes and the surfaces of the worms, so that friction is reduced to a minimum.

The advantages of my invention when applied to a bicycle are evident, such as the impossibility of dust and dirt getting into the gearing, the suppression of noise, the complete housing of all moving parts, and the greatly-improved appearance of the machine. In a tandem bicycle the worms on the two crank-shafts are made to operate upon the same column of balls, as shown in Fig. 9. The two grooved worms B in this case are of opposite pitch.

I have designated some of the worms shown as "driving-worms" and the others as "receiving" or "driven" worms, but it is evident that any one of them can be used either to impart or receive power, as may be desired.

Having thus described my invention, what I claim, and desire to secure by Letters Patent, is—

1. In a power-transmitting gear, the combination with a worm, of a tube adjacent thereto, and an endless series of loose balls held in said tube, the tube being cut away on one side to permit the balls to engage with the worm, and a receiving-hub adapted to be moved by said balls, substantially as described.

2. In a power-transmitting gear, the combination with a worm, of a casing containing a semicircular passage-way adjacent thereto and passing around the same, an endless series of loose balls held in said passage-way in engagement with the worm, and a receiving-hub adapted to be moved by said balls, substantially as described.

3. In a power-transmitting gear, the combination with a worm having semicircular helical grooves, of a casing containing a semicircular passage-way adjacent to said worm, and extending from one end thereof to the other, an endless series of loose balls adapted to pass through said passage-way in engagement with the grooves, and a receiving-hub adapted to be moved by said balls, substantially as described.

4. In a power-transmitting gear, the combination with a driving-shaft, of an endless series of loose balls engaged and moved thereby, a stationary grooved shaft and a receiving-hub mounted thereon and having internal grooves at an angle to the groove in the shaft to be engaged by said moving balls, substantially as described.

5. In a power-transmitting gear, the combination with a driving-shaft, of an endless series of loose balls, engaged and moved thereby, a stationary grooved shaft and a receiving-hub mounted thereon and having parallel helical grooves to be engaged by said balls, substantially as described.

6. In a power-transmitting gear, the combination with a driving-shaft, of an endless series of loose balls engaged and moved thereby, and a receiving-hub mounted on a stationary shaft having a helical groove, said hub being provided with internal grooves to be engaged by said moving balls, substantially as described.

7. In a power-transmitting gear, the combination with a driving-shaft, of an endless series of loose balls, engaged with and moved thereby, and a receiving-hub mounted on a stationary shaft having a helical groove, said hub being provided with internal helical grooves of an opposite pitch to the groove in the shaft, and adapted to be engaged by said moving balls, substantially as described.

8. In a power-transmitting gear, the combination with a stationary grooved casing, of a driving-worm therein, a stationary grooved shaft, a receiving-hub mounted thereon, having internal grooves at an angle to the one in the shaft, and an endless series of loose balls engaging with the grooves in the driving-worm, and passing through the receiving-hub, substantially as described.

9. In a power-transmitting gear, the combination with a stationary grooved casing, of a driving-worm therein, a stationary grooved shaft, a receiving-hub mounted thereon and having internal helical grooves of the opposite pitch to those on the driving-worm, and an endless series of loose balls engaging with the grooves in said worm, shaft and hub, substantially as described.

10. In a bicycle, the combination with a crank-shaft, of a driving-worm mounted thereon, a grooved casing surrounding said worm, an internally-grooved hub for the rear wheel, a stationary shaft on which said hub is mounted, said shaft having a groove from one end to the other at an angle to the grooves in the hub, hollow lower braces extending from the casing around the crank-shaft to the ends of the groove in the stationary rear shaft, and an endless series of loose balls contained in said hollow braces and engaged with the worm and hub, substantially as described.

11. In a bicycle, the combination with a spirally-grooved crank-shaft and a grooved rear driving-wheel hub, of a grooved casing surrounding the crank-shaft, a shaft for supporting said hub having a groove at an angle to those in said hub, an endless series of loose balls, and means for conveying said balls from the crank-shaft to the rear wheel-hub on one side of the wheel, through said hub, and back on the other side of said wheel, substantially as described.

12. In a cycle, the combination with the crank-shaft and the driving-wheel, of an endless medium for transmitting power from said shaft to said wheel, said medium passing axially along said crank-shaft, and from said shaft to the hub of the wheel on one side of the same, then axially along the hub of said wheel, and back to the crank-shaft on the opposite side of the wheel, substantially as described.

In testimony whereof I affix my signature in presence of two witnesses.

FINIS M. BARNEY.

Witnesses:
NATHAN H. MILES,
R. A. LUMLEY.